United States Patent
Hildmann et al.

(10) Patent No.: US 10,531,049 B2
(45) Date of Patent: Jan. 7, 2020

(54) METHODS AND SYSTEMS FOR SCHEDULING OF SENSING PLATFORM NODES

(71) Applicant: NEC EUROPE LTD., Heidelberg (DE)

(72) Inventors: Hanno Hildmann, Madrid (ES); Miquel Martin Lopez, London (GB)

(73) Assignee: NEC CORPORATION, Tokyo (JP)

(*) Notice: Subject to any disclaimer, the term of this patent is extended or adjusted under 35 U.S.C. 154(b) by 109 days.

(21) Appl. No.: 15/562,429

(22) PCT Filed: Aug. 3, 2015

(86) PCT No.: PCT/EP2015/067850
§ 371 (c)(1),
(2) Date: Sep. 28, 2017

(87) PCT Pub. No.: WO2016/155844
PCT Pub. Date: Oct. 6, 2016

(65) Prior Publication Data
US 2018/0091777 A1   Mar. 29, 2018

(30) Foreign Application Priority Data

Mar. 31, 2015  (EP) .................................... 15162087

(51) Int. Cl.
*H04N 7/18*  (2006.01)
*G06K 9/00*  (2006.01)
(Continued)

(52) U.S. Cl.
CPC ......... *H04N 7/181* (2013.01); *G06K 9/00771* (2013.01); *H04Q 9/00* (2013.01);
(Continued)

(58) Field of Classification Search
CPC ...................................................... H04N 7/181
(Continued)

(56) References Cited

U.S. PATENT DOCUMENTS 9,684,834 B1 *   6/2017   Ludwig ............. G06K 9/00677
9,760,914 B2 *   9/2017   Chen-Ritzo ........ G06Q 30/0283
(Continued)

FOREIGN PATENT DOCUMENTS

EP        2434758 A1    3/2012
KR     101505624 B1    3/2015
(Continued)

*Primary Examiner* — Leron Beck
(74) *Attorney, Agent, or Firm* — Leydig, Voit & Mayer, Ltd.

(57) ABSTRACT

A method for observing a predetermined monitoring area, wherein one or more sensing platform nodes are employed to observe a predetermined number of sub-areas of the monitoring area, includes observing the sub-areas of the monitoring area using the sensing platform nodes so as to collect measuring data for the sub-areas. A prediction model is provided for analyzing predictability of measuring data for the sub-areas based on the collected measuring data. Future measuring data is calculated for the sub-areas and uncertainty of the future measuring data over time is calculated using the prediction model. The sensing platform nodes are scheduled for observation of the sub-areas according to a scheduling mechanism. The scheduling of the sensing platform nodes is dependent on the calculated uncertainty of the future measuring data predicted for the sub-areas.

17 Claims, 7 Drawing Sheets

(51) Int. Cl.
*H04Q 9/00* (2006.01)
*H04N 5/232* (2006.01)

(52) U.S. Cl.
CPC ....... *G06K 9/0063* (2013.01); *H04N 5/23206* (2013.01); *H04Q 2209/40* (2013.01)

(58) Field of Classification Search
USPC ........................................................ 348/159
See application file for complete search history.

(56) References Cited

U.S. PATENT DOCUMENTS

| | | | | |
|---|---|---|---|---|
| 2008/0129825 | A1* | 6/2008 | DeAngelis | A63B 24/0021 348/169 |
| 2010/0207762 | A1 | 8/2010 | Lee et al. | |
| 2010/0254612 | A1* | 10/2010 | Oldroyd | G01C 11/00 382/209 |
| 2014/0019397 | A1* | 1/2014 | Alexander | H04W 4/029 706/46 |
| 2014/0114556 | A1* | 4/2014 | Pan | G08G 1/00 701/119 |
| 2015/0166072 | A1* | 6/2015 | Powers | B60W 40/06 701/1 |
| 2015/0186792 | A1* | 7/2015 | Chidlovskii | G06Q 50/26 706/12 |
| 2015/0195806 | A1 | 7/2015 | Lee et al. | |
| 2015/0269838 | A1* | 9/2015 | Joseph | G08G 1/0112 701/117 |
| 2015/0302241 | A1* | 10/2015 | Eineren | A01J 5/007 382/110 |

FOREIGN PATENT DOCUMENTS

| WO | WO 2012162433 | A2 | 11/2012 |
|---|---|---|---|
| WO | WO 2014016471 | A1 | 1/2014 |

* cited by examiner

METHODS AND SYSTEMS FOR SCHEDULING OF SENSING PLATFORM NODES

CROSS-REFERENCE TO PRIOR APPLICATIONS

This application is a U.S. National Stage Application under 35 U.S.C. § 371 of International Application No. PCT/EP2015/067850 filed on Aug. 3, 2015, and claims benefit to European Patent Application No. EP 15162087.9 filed on Mar. 31, 2015. The International Application was published in English on Oct. 6, 2016 as WO 2016/155844 A1 under PCT Article 21(2)

FIELD

The present invention relates to a method and a system for observing a predetermined monitoring area.

BACKGROUND

Traditional monitoring techniques for a large area using mobile sensors are based on periodically checking on different sub-areas of the large area. This guarantees a maximum age of the observation, but is inappropriate for most scenarios, where the rate of change for the observed variable can greatly differ from location to location and change over time.

There are numerous scenarios where surveillance and monitoring of large areas are required. These may include:
- Monitoring and surveillance of large areas for agriculture purposes
- Environmental or other survey operations such as deforestation, air pollution or in the context of traffic analysis
- Monitoring due to contractually agreed security contracts and/or risk assessment to prevent danger escalation at crowded places, e.g. department stores, hospitals, airports, schools, etc.

Typically, the areas to be observed are orders of magnitude larger than the sum of the areas each individual sensing platform can observe at any given time, in particular if the number of devices of a fleet is fixed. This leads to the need to coordinate and schedule the sensing platforms in a semi-coordinated fashion.

The basic rule of thumb normally involves ensuring that the last observation for each sub area is fresher than a threshold maximum age. Naturally, this leads to inefficiencies, since not all areas exhibit the same risks or change dynamics. To palliate this, it is common to use domain knowledge and manual adjustments to ensure that critical areas are observed more regularly or even continuously.

The following application scenario applying a known method or system illustrates its problems: For the purpose of traffic analysis one might decide to have a fleet of drones with zenithal cameras looking down on the streets to estimate traffic and people counts at different parts of a city. It would make sense to ensure that more drones oversee the downtown areas on weekdays, or that at least drones either stay longer in the area or come more regularly.

SUMMARY

In an embodiment, the present invention provides a method for observing a predetermined monitoring area, wherein one or more sensing platform nodes are employed to observe a predetermined number of sub-areas of the monitoring area. The sub-areas of the monitoring area are observed using the sensing platform nodes so as to collect measuring data for the sub-areas. A prediction model is provided for analyzing predictability of measuring data for the sub-areas based on the collected measuring data. Future measuring data is calculated for the sub-areas and uncertainty of the future measuring data over time is calculated using the prediction model. The sensing platform nodes are scheduled for observation of the sub-areas according to a scheduling mechanism. The scheduling of the sensing platform nodes is dependent on the calculated uncertainty of the future measuring data predicted for the sub-areas.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
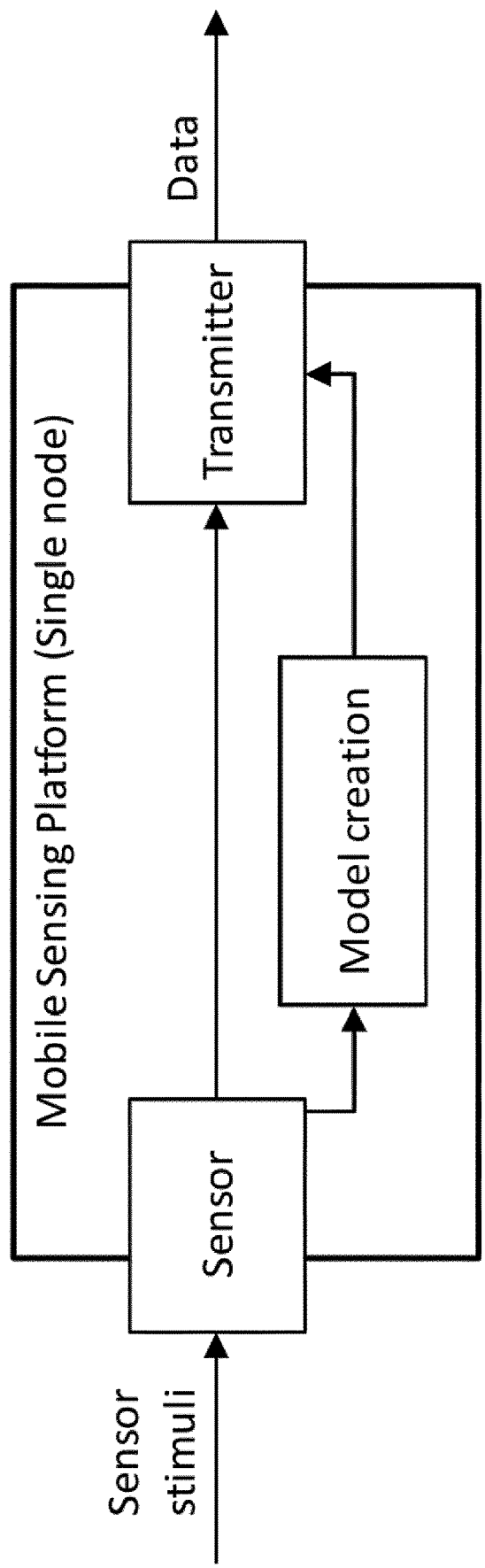
FIG. 1 is a schematic view illustrating a mobile sensing platform node that may be used in a method or a system according to an embodiment of the present invention.

While the fleet of drones approach described above may work for normal situations, the inventors have discovered that it has critical problems:
- The drone allocation is made manually based on domain knowledge, which is likely to be biased. This could lead to situations where drones over-examine areas deemed important, while under-examining middle or low importance areas.
- The system evolves slowly: an area will only gain importance once events of interest have been repeatedly observed in it, but that is likely to take a long time, given that the area is, in the first place, under-observed.

In an embodiment, the present invention provides a method and a system for observing a predetermined monitoring area in such a way that information for the monitoring area can be collected more efficiently.

In accordance with an embodiment of the invention, a method is provided for observing a predetermined monitoring area, wherein one or more sensing platform nodes are employed to observe a predetermined number of sub-areas of said monitoring area, the method comprising:

observing sub-areas of said monitoring area using the sensing platform nodes in order to collect measuring data for said sub-areas, providing at least one prediction model for analyzing predictability of measuring data for said sub-areas on the basis of collected measuring data, calculating future measuring data for said sub-areas and calculating uncertainty of said future measuring data over time by the use of the prediction model, and scheduling the sensing platform nodes for observation of said sub-areas according to a scheduling mechanism, wherein the scheduling of the sensing platform nodes is dependent on the calculated uncertainty of said future measuring data predicted for said sub-areas.

In accordance with another embodiment of the present invention, a system is provided for observing a predetermined monitoring area, the system comprising at least one sensing platform node for observing a predetermined number of sub-areas of said monitoring area, at least one prediction model entity and at least one planner entity, wherein said system is configured to observe sub-areas of said monitoring area using the sensing platform nodes in order to collect measuring data for said sub-areas, wherein said prediction model entity is configured to analyze predictability of measuring data for said sub-areas on the basis of collected measuring data, wherein said prediction model entity is further configured to calculate future measuring data for said sub-areas and to calculate uncertainty of said future measuring data over time, and wherein said planner entity is configured to schedule the sensing platform nodes for observation of said sub-areas, wherein the scheduling of the sensing platform nodes is dependent on the calculated uncertainty of said future measuring data predicted for said sub-areas.

According to an embodiment of the invention it has first been recognized that a scheduling of sensing platform nodes according to actual information gain provides an enormous improvement in the context of monitoring a large area, rather than traditional, more rigid periodic or manual scheduling. Specifically, one or more sensing platform nodes are employed to observe a predetermined number of sub-areas of a predetermined monitoring area. Thus, measuring data for the sub-areas is collected by observing the sub-areas of the monitoring area using the sensing platform nodes. Further it has been recognized that information about the area that shall be observed can be efficiently and flexibly obtained by providing a prediction model for analyzing predictability of measuring data for the sub-areas on the basis of the collected measuring data, wherein—according to the invention—future measuring data for the sub-areas together with the uncertainty of the future measuring data are calculated by the use of the prediction model. The prediction model may be implemented in a prediction model entity. The sensing platform nodes for observing the sub-areas are scheduled according to a scheduling mechanism, wherein the scheduling of the sensing platform nodes is dependent on the calculated uncertainty of the future measuring data predicted for the sub-areas. For instance, the scheduling may be controlled by a planner entity. Thus, this information gain approach may enable an optimal scheduling of sensing platform nodes for maximizing the monitoring information, e.g. collected by a limited fleet or a predetermined and/or fixed number of sensing platform nodes. By doing this, the predetermined monitoring area can be observed in an efficient and flexible way.

Furthermore, it is mentioned that the term "sensing platform node" is to be understood in the broadest sense. For example a sensing platform node may be any movable or non-movable device having the capability to sense any kind of data. For instance a sensing platform node may include, but is not limited to, a drone e.g. equipped with a sensor and/or a camera as sensor, a car e.g. equipped with radar sensors, a tablet e.g. equipped with a camera, a user equipment e.g. equipped with a camera, a mobile user device e.g. equipped with a camera, a cell-phone e.g. equipped with a camera, a tablet computer e.g. equipped with a camera, or a personal computer e.g. equipped with a camera, a microphone, or the like.

According to embodiments of the invention the sensing platform nodes may include mobile sensing platform nodes that are movable to, preferably different, sub-areas of the monitoring area, wherein the mobile sensing platform nodes are moved individually to the sub-areas for observing the sub-areas according to the scheduling mechanism. The mobile sensing platform nodes may include mobile robots, robot vehicles, drones, etc. The nodes may be configured to be remotely directed. Thus, the scheduling according to the scheduling mechanisms enables an efficient and flexible distribution of the nodes over the sub-areas of the monitoring areas for collecting measurement data and information. For example, by providing statistical information guarantees and/or gain and performing the scheduling mechanisms for the covered area the amount of required mobile sensing platform nodes may be reduced.

According to embodiments of the invention the sensing platform nodes may include static sensing platform nodes that are located on, preferably different, sub-areas of the monitoring area, and wherein the static sensing platform nodes are accessed and/or actuated for observing the sub-areas according to the scheduling mechanism. To this extent, accessing and/or actuating the static sensor platform nodes may mean that a predetermined number of computers employs the static sensing platform nodes for observing the sub-areas by controlling and switching to the static sensing platform nodes according to the implemented scheduling mechanism. Thus, embodiments of the invention may be applied to more scenarios than just swapping sensors between locations. For instance, in case of the sensing platform nodes are static, it may be provided that the ability to read from these sensing platform nodes could be the dynamic element. An intuitively understandable example may be given as follows, namely a collection of cameras which cannot all be observed at the same time. In other words, such an embodiment has the peculiarity that instead of discussing e.g. geographical areas having to be monitored, the scheduling concerns the access to distinct resources in the form of the static sensing platform nodes. For example, it is possible that a predetermined number of computers monitors a higher number of static sensing platform nodes, wherein, e.g., only one computer can monitor only one static sensing platform node at a time, such that the scheduling and/or the scheduling mechanism regulates the switching among the sensing platform nodes. An example in this regard would be a scenario where 100 cameras are being monitored by a set of 10 computers, where each computer can only observe one computer at a time. In such a case, the computers would switch among cameras much like mobile sensing platform nodes would switch around locations.

According to embodiments of the invention the sensing platform nodes may sense a numerical magnitude that can be quantified by measurement. For instance, the sensing platform nodes may observe the sub-areas by sensing a chemical and/or physical quantity. This may be applied, but is not limited to, in the context of environment measures e.g. concerning thermal, humidity and/or CO2, in the context of pollution, deforestation and/or water salinity, in the context of detecting traffic flows and/or people flows, etc. Consequently, the sensing platform nodes may detect and observe a characteristic of their environment, wherein the quantity/magnitude measured by the sensing platform nodes represents the characteristic of the sub-area. For example, the sensing platform nodes may be equipped with one or more sensors for measuring pressure, temperature, force, torque, acceleration, magnetic field, radiation, video surveillance, etc.

According to embodiments of the invention the measuring data of an observed sub-area may be provided as a time series of values, wherein by learning from acquired values the prediction model is derived for predicting future values representing the future measuring data of the sub-area. To this extent, it may be provided that each observable sub-area is considered as a time series of values provided by an arbitrarily complex sensor.

For instance, it may be provided that a fleet of mobile sensing platform nodes is considered as a traditional wireless sensor network (WSN) with the exception that the mobile sensing platform nodes can be moved to desired locations or rather sub-areas. Embodiments of the invention might borrow from ideas developed in the context of WSN. With regard to WSN, power consumption is a specific problem. WSN devices are typically low power optimized and meant to last in the field for long periods. As such, their main power drains comes not from their normal operations including sensing, but from actually transmitting the collected information over a wireless link. To ease the power burden of communication, miscellaneous techniques have been developed for WSN. However, according to embodiments of the invention, it is focused on lossy data compression: by learning from values sensed up to the present time, a sensor may attempt to derive a model that explains future values in a variety of ways including sensing the parameters that govern a stochastic process that mimics the observed data, or transmitting an expected value together with its expected uncertainty. Mobile sensing networks, as opposed to their WSN counterparts, do not suffer from the same constraints. Typically, the energy required to physically move the mobile sensing platform nodes far outweighs the communication costs. Their constraint is much more subtle: by measuring at a location, the system sacrifices its knowledge about other locations. Embodiments of the invention may use algorithms and/or mechanisms for the purpose of power saving which have been developed in WSN, however in a new area relating to mobile sensing platforms, and for a different purpose: maximizing the information a system collects for a large observed area.

Furthermore, it may be provided that time series generated by a sensing platform node are evaluated, preferably by using an off-the-shelf prediction algorithm such as ARIMA (Autoregressive integrated moving average), Kalman Filters, etc. In this regard, it is exemplarily referred to "A New Approach to Linear Filtering and Prediction Problems", Transactions of the ASME—Journal of Basic Engineering, No. 82 (Series D), 1960, pp. 35-45 by R. E. Kalman.

According to embodiments of the invention the uncertainty of calculated future measuring data may be calculated by determining and considering confidence intervals pertaining to the calculated future measuring data. The prediction algorithm may be used to predict future values, and will yield not only estimated values, but also a confidence interval, e.g. the temperature will be 5 C+/−1 C. Typically confidence intervals expand the further away it is attempted to predict. Therefore it may be assumed that while predicted temperature will be within +/−1 C in the next 5 minutes, it might be expected that the temperature is, for instance, +/−5 C in an hour. Hence, uncertainty prediction over time may be performed by determining confidence intervals in the future.

For the purpose of mathematical analysis, it may be assumed a simplified model that estimates confidence interval width as a function of time that increases proportionally with a factor $\alpha$:

$$\text{uncertainty}(t) = |\text{maxval}(t) - \text{minval}(t)| = \alpha \cdot (t - t_0)$$

Here, factor $\alpha$ may indicate how much uncertainty will increase the further away the considered time t is from $t_0$. Note that $\alpha$ is the modelled parameter, and depends on the surveyed area, i.e. the position of the mobile sensing platform. It is mentioned that $\alpha$ might be linear or non-linear. Thus, the goodness of a surveillance using a cost function can be defined.

According to embodiments of the invention, it may be provided that the scheduling is performed on the basis of a cost function J(t) according to $$J(t) = \sum_i P_i \cdot \text{uncertainty}_i(t) \ \forall \ i \in \text{sub-areas to observe}$$

wherein $\text{uncertainty}_i(t)$ is the uncertainty of predicted future measuring data for sub-area i at time t, wherein parameter $P_i$ is 0 when a sensing platform node observes sub-area i at time t, and wherein parameter $P_i$ is 1 when the sensing platform node does not observe sub-area i at time t. Thus, the information gathered from a sensing platform node may be optimized for the available sensing platform nodes.

Consequently, according to a cost function J(t), $P_i$ may be 0 or 1 depending on whether a sensor of a sensing platform node is located at sub-area i at time t. If the sensor is in the sub-area, the $P_i$ is 0, meaning the uncertainty is 0. If there is no sensor at sub-area i, then $P_i$ is 1, and an aggregated uncertainty is determined as per the above formula J(t).

According to embodiments of the invention an optimization algorithm may be employed in order to determine the scheduling of the sensing platform nodes such that the uncertainty is minimized. For example, once t is fixed in the above formula J(t), traditional optimization algorithms may be used to find the combination of locations of sensing platform nodes, i.e. the collocation of the nodes in sub-areas, that minimizes the uncertainty. For example, a gradient descent may be used as optimization algorithm.

According to embodiments of the invention the scheduling mechanism may consider an aggregated uncertainty of the predicted future measuring data with regard to the observed monitoring area, wherein the scheduling is performed in such a way that the aggregated uncertainty is reduced and/or minimized.

According to embodiments of the invention the scheduling mechanism may adjust the duration for observing a sub-area in such a way that sufficient measuring data are collected for the sub-area in order to enhance the prediction model being able to calculate future measuring data. To this extent, the observation duration may be adjusted in such a way that the uncertainty of the calculated future measuring data does not exceed a predetermined uncertainty. Thus, the prediction model may be able to provide an uncertainty of its calculated future measuring data that does not exceed a predetermined uncertainty. By doing this, it may be chosen and determined when a prediction model is good enough or acceptable, i.e. when can the improving and processing of the prediction model be stopped because the provided/available uncertainty is acceptable. In this regard it is considered whether staying for a short time longer will enable the sensing platform node to remain away from this location for longer. In extreme cases, this might mean that unless the sensing platform node stays longer at this location there are no means to predict any data with any reliability, because the data collected so far is rubbish. Furthermore, this may be applied in a situation where multiple sub-areas should monitored periodically, but sensing takes a varying amount of time depending on interferences, occlusions or other physical phenomena. In such a case, mobile sensing platform nodes might need to remain longer in sub-areas where sensing is harder, and potentially build a prediction model to assess the validity of the measures taken thus far. Hence, in such an example, the validity of the acquired data can be maximized.

According to embodiments of the invention the scheduling mechanism may be individually implemented in the sensing platform nodes such that the sensing platform nodes are able to make autonomous scheduling decisions. Thus, mobile sensing platform nodes may be autonomously routed based on information guarantees and/or information gain, without the need of a centralized planning entity that controls all of the available sensing platform nodes.

According to embodiments of the invention the uncertainty of predicted future measuring data of a sub-area may be calculated by considering the uncertainty and/or measuring data of one or more nearby sub-areas. Thus, the uncertainty in sub-areas near to the sensing platform node may be considered: the further into the future we look, the more uncertainty we have for the measurement in that sub-area/location additionally, the further away we go from the point of measurement, the more the uncertainty increases. Uncertainty therefore depends on how long ago a measurement was taken at the position or at a neighbouring position. In principle, it may be stated that uncertainty of predicted data is calculated and according to embodiments of the invention it may be considered the case where reading from one sensor will not only provide data about the location where that sensor is, but also information about near-by locations where other sensors might be. An intuitively understandable example concerns temperature sensors: if it is 15 degrees here, then it won't be 100 degrees in the next room. So even without visiting a location to verify predictions, it might still be able to update the model/verify the predictions—reduce the uncertainty—by using a model of how the sensors of different sensing platform nodes relate to one another.

According to embodiments of the invention, it may be provided that the prediction model entity and/or the planner entity is/are implemented at the sensing platform node.

Furthermore, according to embodiments of the invention, it may be provided that the prediction model entity and/or the planner entity is/are implemented centralized, in particular at a receiver that receives measuring data collected by the sensing platform nodes.

According to the present invention and/or preferred embodiments the uncertainty of the predicted data over time may be calculated, i.e. how much the uncertainty increases over time. It is predicted data using prediction models which get better the longer it is observed the actual readings. Hence, one has to choose where to collect data, e.g. from sensors at location 1 or at location 2, so as to minimize the combined/aggregated uncertainty between locations, i.e. sub-areas of a predetermined monitoring area. One may use the ability to calculate the uncertainty of predicted measuring data to determine when it is beneficial to stop predicting and instead start collecting actual measuring data, however at the cost of stopping the data collection at another location/sub-area and starting to predict data with increasing uncertainty there.

The present invention and/or preferred embodiments may provide the following advantages:
  faster adaptation to scenarios where areas of interest are not constant;
  automated scheduling of sensing platform nodes that requires less manual oversight;
  self-healing mechanism that may automatically organize remaining mobile sensing platform nodes in case of failure of a mobile sensing platform node.

FIG. 1 is a schematic view illustrating a mobile sensing platform node that may be used in a method or a system according to an embodiment of the present invention. The mobile sensing platform node of FIG. 1 comprises a sensor, a prediction model entity for model creation and a transmitter. Sensor stimuli effect the sensor which then passes the sensed data to a transmitter. The transmitter sends the measuring data to a data sink that collects all the information. In addition, however, the mobile sensing platform node may create a model using the prediction model entity. The created prediction model can be used to predict future values, i.e. future measuring data as well as their uncertainty, which is sent along with the measuring data to the data sink.

Figure 2:
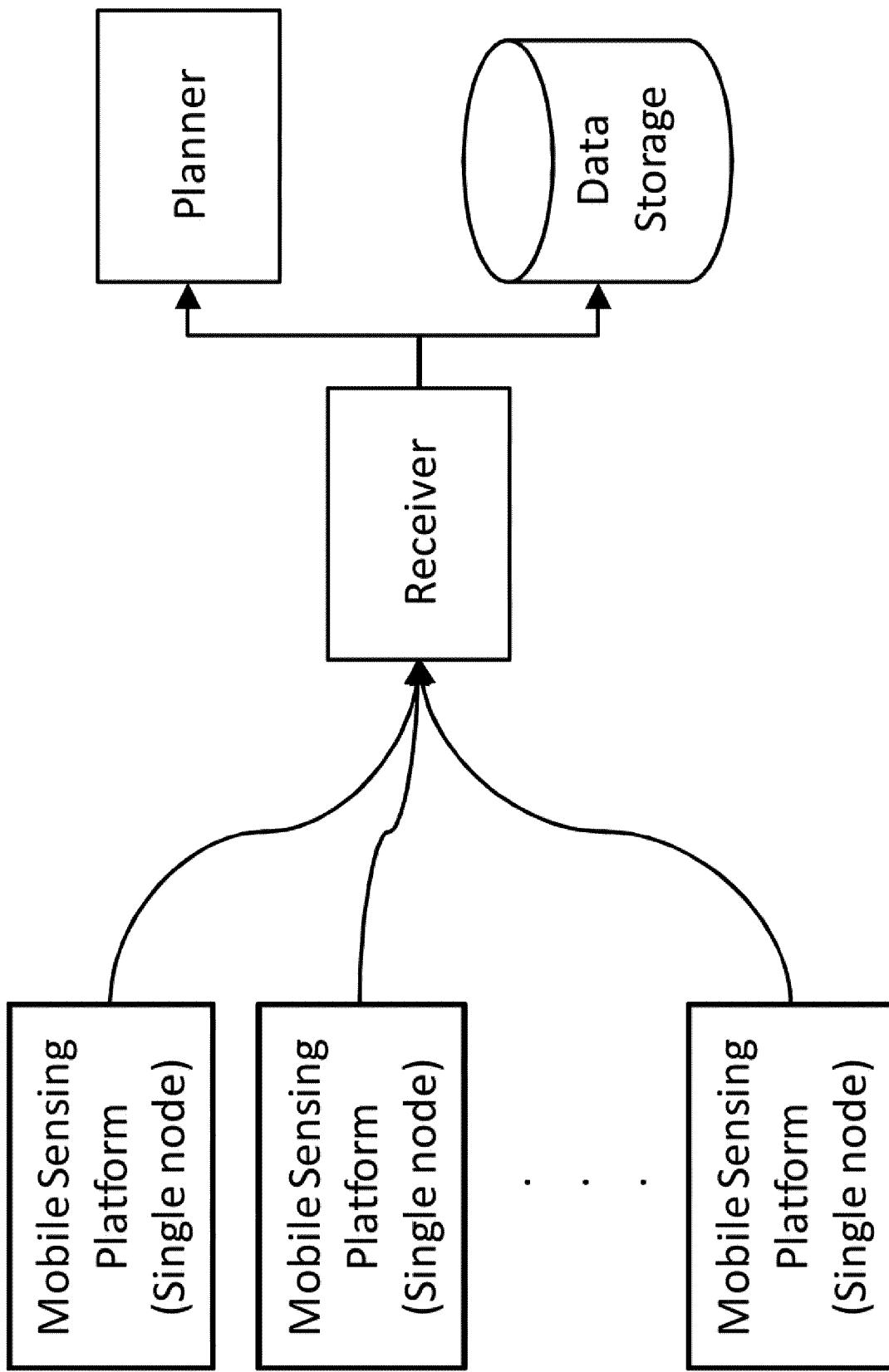
FIG. 2 is a schematic view illustrating an application scenario of a method and a system according to an embodiment of the present invention.

FIG. 2 shows an application scenario of a method and a system according to an embodiment of the present invention, wherein the illustrated system for observing a predetermined monitoring area comprises mobile sensing platform nodes in accordance with the embodiment depicted in FIG. 1. The mobile sensing platform nodes collect and generate measuring data which are sent to a receiver as data sink. The prediction model may be then used at the planning phase in the planner entity as shown in FIG. 2, wherein the planner entity is centrally implemented on the receiver end. Furthermore, the system includes a data storage in the receiver end.

Essentially, the prediction models created at the sensing platform nodes may be used to estimate the quality of information prediction for the sensor location, and this is used to have mobile sensing platform nodes remain on a spot or move them to sub-areas where they are more needed.

Figure 3:
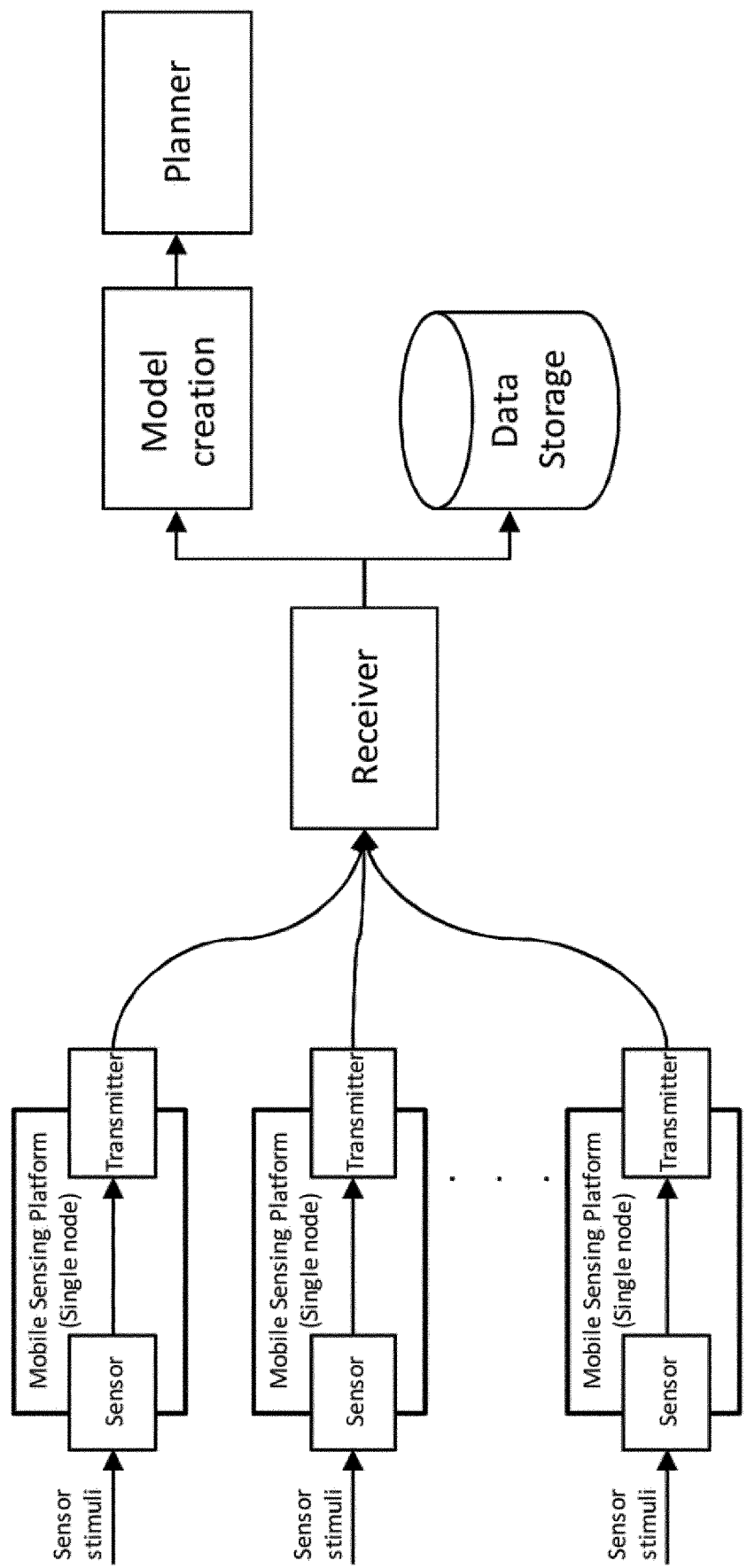
FIG. 3 is a schematic view illustrating an application scenario of a method and a system according to an embodiment of the present invention.

FIG. 3 shows an application scenario of a method and a system according to another embodiment of the present invention, wherein an embodiment is illustrated where a prediction model creation is done in the receiver end. Thus, the prediction model entity is implemented and located centrally in the receiver end. Furthermore, a data storage is located on the receiver end.

Figure 4:
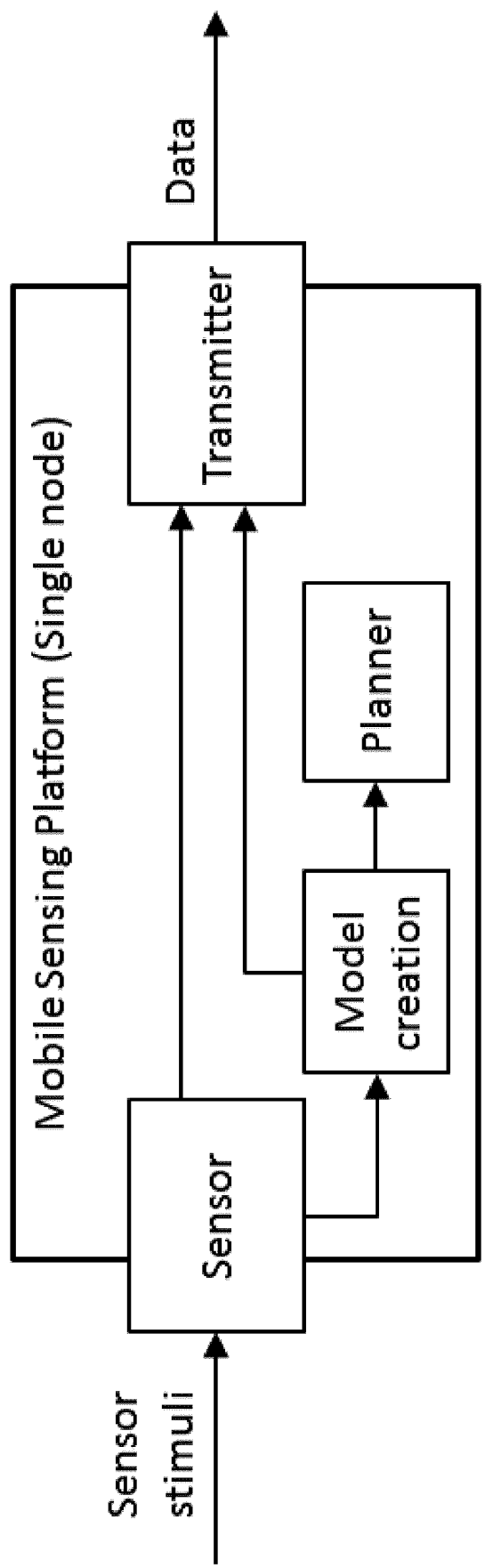
FIG. 4 is a schematic view illustrating a mobile sensing platform node that may be used in a method or a system according to an embodiment of the present invention.

FIG. 4 is a schematic view illustrating a mobile sensing platform node that may be used in a method or a system according to an embodiment of the present invention. The mobile sensing platform node of FIG. 4 comprises a sensor, a prediction model entity for model creation, a planner entity and a transmitter. The local implementation of the planner entity at the mobile sensing platform node enables to add autonomy to the mobile sensing platform node. Thus, as described with regard to FIGS. 1 to 3, the information from the prediction model is also used in a planner entity/module which is inside the mobile sensing platform node. Consequently, the procedure may be basically analogous to the embodiments of FIGS. 1 to 3, however with the difference that there is no need for an external system that takes on the role of the planner. For example, an on-board module may be implemented that enables the mobile sensing platform node to make independent decisions regarding the location and schedule of future locations/sub-areas to visit, and when to do so.

Figure 5:
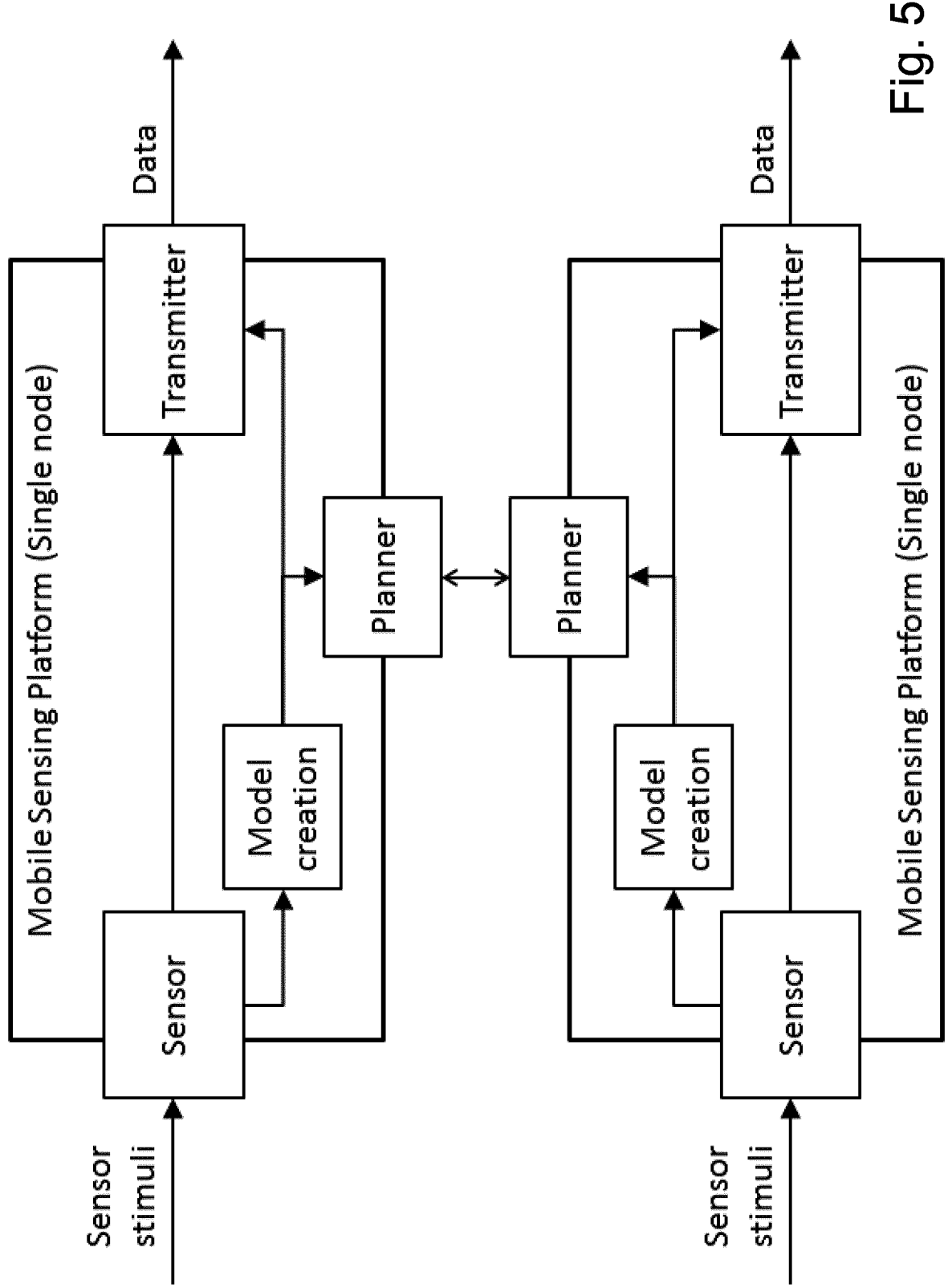
FIG. 5 is a schematic view illustrating an application scenario of a method and a system according to an embodiment of the present invention.

FIG. 5 is a schematic view illustrating an application scenario of a method and a system according to an embodiment of the present invention, wherein a fleet of more than one mobile sensing platform nodes using a scheduling mechanism to schedule their collective actions without a central planner module. According to the embodiment depicted in FIG. 5, the planner entities of several mobile sensing platform nodes may communicate among themselves.

Figure 6:
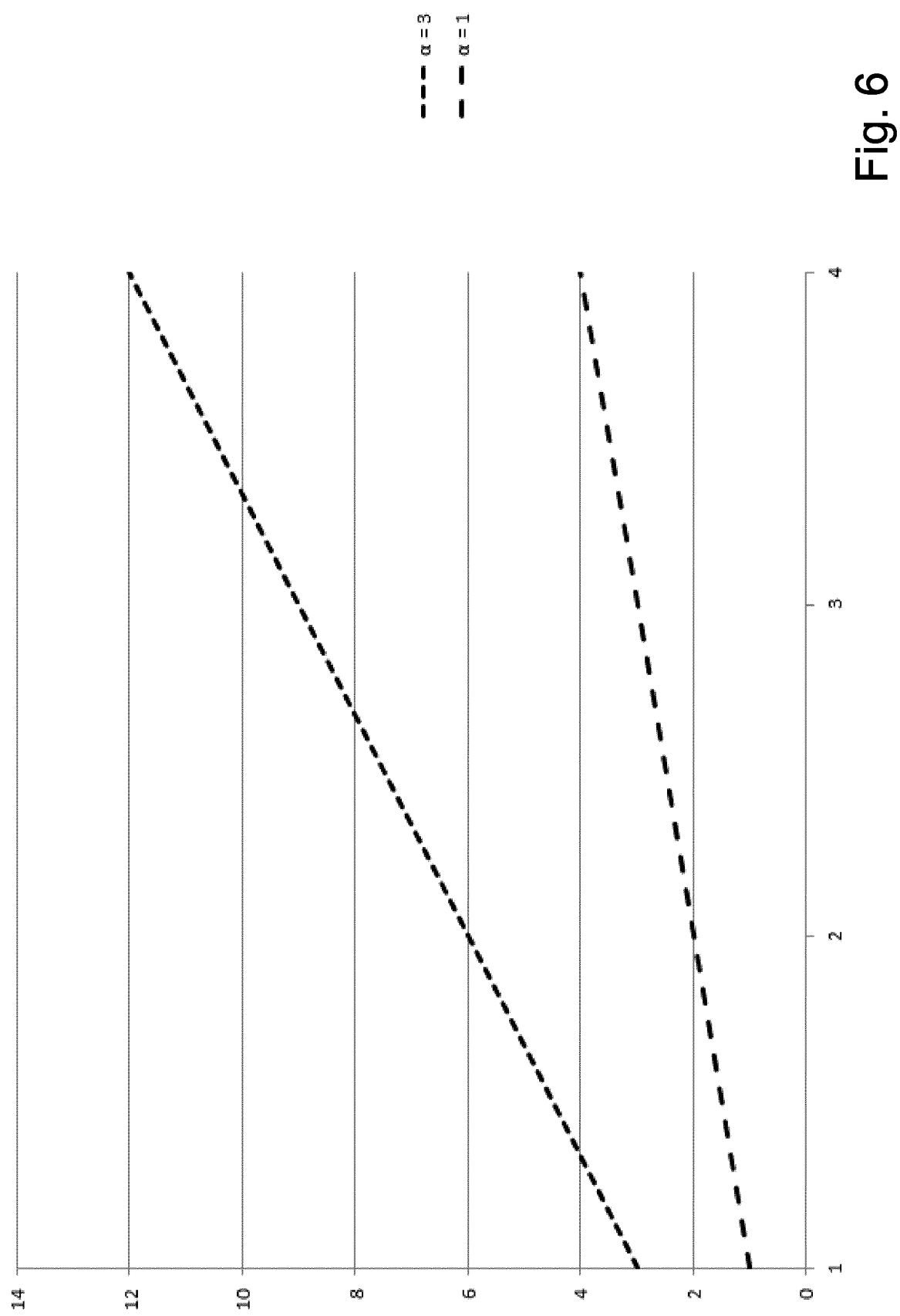
FIG. 6 is a diagram illustrating the development of uncertainties over time in the context of an application scenario of a method according to an embodiment of the present invention.

FIG. 6 illustrates the development of uncertainties over time in the context of an application scenario of a method according to an embodiment of the present invention. The values on the y-axis represent the uncertainty for the respective $\alpha$. The x-axis shows the number of time steps since the last sensor of the sensing platform node reading at a location. The longer ago the last sensor reading was, the higher the uncertainty for that location will be.

According to the application scenario of FIG. 6, the times series coming from a mobile sensing platform node can be evaluated using off-the shelf prediction algorithms such as Kalman Filters, ARIMA etc. These can be used to predict future values, and will yield not only an estimation, but also a confidence interval (e.g. the temperature will be 5 C+/−1 C). Typically confidence intervals expand the further away it is attempted to predict. Therefore it may be known that while predicted temperature will be within +/−1 C in the next 5 minutes, it might be expected that the temperature is, for instance, +/−5 C in an hour.

For the purpose of mathematical analysis, it is assumed a simplified model that estimates confidence interval width as a function of time that increases proportionally with a factor $\alpha$:

$$\text{uncertainty}(t) = |\text{maxval}(t) - \text{minval}(t)| = \alpha \cdot (t - t_0)$$

Here, $\alpha$ indicates how much uncertainty will increase the further away the considered time t is from t0. Note that $\alpha$ is the modeled parameter, and depends on the surveyed area, i.e. the position of the mobile sensing platform.

With this, it is now able to define the goodness of a surveillance using the following cost function J:

$$J(t) = \sum_i P_i \cdot \text{uncertainty}_i(t) \; \forall \; i \in \text{sub-areas to observe}$$

$P_i$ is 0 or 1 depending on whether a sensor is located at location i at time t. If the sensor is in the location, the $P_i$ is 0, meaning the uncertainty is 0. If there is no sensor at location i, then $P_i$ is 1, and uncertainty is determined as per the above formula.

Once t is fixed, it can be used traditional optimization algorithms such as gradient descent to find the combination of locations of mobile sensing platform nodes that minimizes the uncertainty.

The main factor affecting the solution will be a, which indicates how quickly uncertainty increases for an area over time. In a simplified scenario, there could be $\alpha_1=3$ and $\alpha_2=1$ for locations/sub-areas 1 and 2. The graphs illustrated in FIG. 6 show the development of the uncertainties $\alpha_1$ and $\alpha_2$. The respective graphs show how the uncertainty about a location will increase for as long as there is no sensor at this location/sub-area.

Of course, once a sensor is placed at a location the uncertainty at this location drops to zero.

From the growing uncertainties, it can then be calculated the accumulated or aggregated uncertainty at all locations/sub-areas using, e.g., the formula provided before for calculating J(t). Specifically, this is exemplarily illustrated by the following example, which will detail how the aggregated uncertainty J(t) may be calculated.

Figure 7:
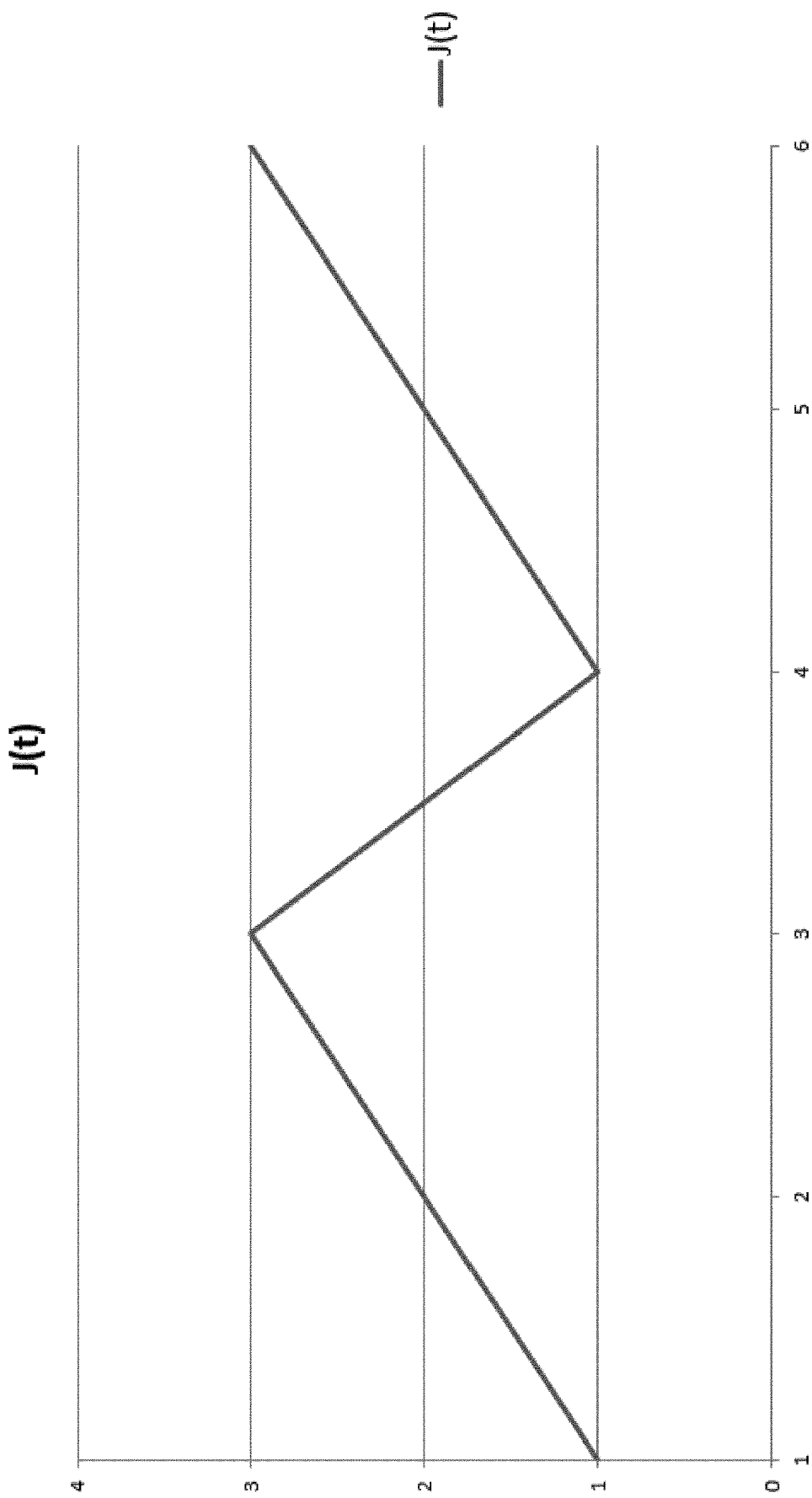
FIG. 7 is a diagram illustrating the development of an aggregated uncertainty J(t) according the an application scenario of a method according to an embodiment of the present invention.

The uncertainty at a location where it is a sensor is zero, the uncertainty at a location without a sensor increases each time step (but drops to zero once it is placed a sensor there). In graphs of FIG. 6 the lines represent the uncertainty for both locations, n time steps after t=0 (with n being marked in the x-axis). While the uncertainty for location 1 and 2 increases continuously, the system—aggregated—uncertainty J(t) (the lowest aggregated uncertainty for both locations given that it has only one sensor to allocate to both locations for each time step), shown in FIG. 7, increases to 3 but does not exceed it. The following step by step walkthrough will explain why this is the case.

It is started "fresh" (so to speak) which basically means that it starts with zero uncertainty at either location. This is equivalent to saying that $t_0^i$ (the last time step at which it has a sensor reading at location 1)=0 for both locations.

At t=0, we have a sensor in location 1 and remove the sensor in location 2
thus: $P_1=0$, $P_2=1$, and for both locations $t_0=0$ ($t_0^1=0$, $t_0^2=0$)
The 'uncertainty for sensor 1' is uncertainty$_1(0)=(3\cdot 0)$
=0
The 'uncertainty for sensor 2' is uncertainty$_2(0)=(1\cdot 0)$
=0
$J(0)=P_1\cdot\text{uncertainty}_1(0)+P_2\cdot\text{uncertainty}_2(0)$
$P_1=0$, $P_2=1$, therefore uncertainty $J(0)=0\cdot 0+1\cdot 0$
At t=1, we do not move the sensor (thus $P_1=0$, $P_2=1$).
for location 1 $t_0^1=1$, for location 2 $t_0^2=0$ (indicating the last sensor reading there)
$(t-t_0^1)=(1-1)=0$, thus uncertainty$_1(1)=\alpha\cdot 0=0$
$(t-t_0^2)=(1-0)=1$, thus uncertainty$_2(1)=\alpha\cdot 1=\alpha$
The 'uncertainty for sensor 1' is uncertainty$_1(1)=(3\cdot 0)$
=0
The 'uncertainty for sensor 2' is uncertainty$_2(1)=(1\cdot 1)$
=1
$J(1)=P_1\cdot\text{uncertainty}_1(1)+P_2\cdot\text{uncertainty}_2(1)$
$P_1=0$, $P_2=1$, therefore uncertainty $J(1)=0\cdot 0+1\cdot 1=1$
At t=2, we do not move the sensor (thus $P_1=0$, $P_2=1$).
for location 1 $t_0^1=2$, for location 2 $t_0^2=0$
$(t-t_0^1)=(2-2)=0$, thus uncertainty$_1(2)=\alpha\cdot 0=0$
$(t-t_0^2)=(2-0)=2$, thus uncertainty$_2(2)=\alpha\cdot 2$
The 'uncertainty for sensor 1' is uncertainty$_1(2)=0$
The 'uncertainty for sensor 2' is uncertainty$_2(2)=(1\cdot 2)$
=2
$J(2)=P_1\cdot\text{uncertainty}_1(2)+P_2\cdot\text{uncertainty}_2(2)$
$P_1=0$, $P_2=1$, therefore uncertainty $J(2)=0\cdot 0+1\cdot 2=2$
At t=3 we entertain two cases:
Case 1: do not move the sensor (thus $P_1=0$, $P_2=1$)
for location 1 $t_0^1=3$, for location 2 $t_0^2=0$
$(t-t_0^1)=(3-3)=0$, thus uncertainty$_1(3)=\alpha\cdot 0=0$
$(t-t_0^2)=(3-0)=3$, thus uncertainty$_2(3)=\alpha\cdot 3$ The 'uncertainty for sensor 1' is uncertainty$_2$(3)=0
The 'uncertainty for sensor 2' is uncertainty$_2$(3)= (3·1)=3
for this sensor allocation uncertainty J(3)=0·0+1·3=3
Case 2: we do move the sensor from location 1 to location 2 (thus P$_1$=1, P$_2$=0).
  for location 1 t$_0^1$=2 (from the previous time step), for location 2 t$_0^2$=3
  (t−t$_0^1$)=(3−2)=1, thus uncertainty$_1$(3)=α·1=α
  (t−t$_0^2$)=(3−3)=0, thus uncertainty$_2$(3)=α·0=0
  The 'uncertainty for sensor 1' is uncertainty$_1$(3)= (3·1)=3
  The 'uncertainty for sensor 2' is uncertainty$_2$(3)= (1·0)=0
  for this sensor allocation uncertainty J(3)=1·3+0·0=3

So far it has been explained the values for J(t) shown in FIG. 4. If we now take a look at the two choices we have for t=4, and assume that we did not move sensors at t=3, (thus P$_1$=0, P$_2$=1)
If t=3 validates P$_1$=0, P$_2$=1, then at t=4 we can again entertain two cases:
Case 1: P$_1$=0, P$_2$=1 (no change in the placement of sensors)
  for location 1 t$_0^1$=4, for location 2 t$_0^2$=0
  (t−t$_0^1$)=(4−4)=0, thus uncertainty$_1$(4)=α·0=0
  (t−t$_0^2$)=(4−0)=4, thus uncertainty$_2$(4)=α·4
  The 'uncertainty for sensor 1' is uncertainty$_1$(4)=0
  The 'uncertainty for sensor 2' is uncertainty$_2$(4)= (4·1)=4
  for this sensor allocation uncertainty J(4)=0·0+1·4=4
Case 2: we do move the sensor from location 1 to location 2 (thus P$_1$=1, P$_2$=0).
  for location 1 t$_0^1$=3 (from the previous time step), for location 2 t$_0^2$=4
  (t−t$_0^1$)=(4−3)=1, thus uncertainty$_1$(4)=α·1=α
  (t−t$_0^2$)=(4−4)=0, thus uncertainty$_2$(4)=α·0=0
  The 'uncertainty for sensor 1' is uncertainty$_1$(4)= (3·1)=3
  The 'uncertainty for sensor 2' is uncertainty$_2$(4)= (1·0)=0
  for this sensor allocation uncertainty J(4)=1·3+0·0=3

Clearly Case 2 is better (when no sensors are moved at t=3). The two choices we have for t=4, assuming that we did move sensors at t=3, (thus Case 2, resulting in P$_1$=1, P$_2$=0), leaves us with:
If, however, t=3 validates P$_1$=1, P$_2$=0, then at t=4 we can again entertain two cases:
Case 1: changing the placement of sensors (P$_1$=0, P$_2$=1)
  for location 1 t$_0^1$=4, for location 2 t$_0^2$=3
  (t−t$_0^1$)=(4−4)=0, thus uncertainty$_1$(4)=α·0=0
  (t−t$_0^2$)=(4−3)=1, thus uncertainty$_2$(4)=α·1
  The 'uncertainty for sensor 1' is uncertainty$_1$(4)=0
  The 'uncertainty for sensor 2' is uncertainty$_2$(4)= (1·1)=1
  for this sensor allocation uncertainty J(4)=0·0+1·1=1
Case 2: we do not move the sensors (thus P$_1$=1, P$_2$=0).
  for location 1 t$_0^1$=2 (from the previous time step), for location 2 t$_0^2$=4
  (t−t$_0^1$)=(4−2)=2, thus uncertainty$_1$(4)=α·2
  (t−t$_0^2$)=(4−4)=0, thus uncertainty$_2$(4)=α·0=0
  The 'uncertainty for sensor 1' is uncertainty$_1$(4)= (3·2)=6
  The 'uncertainty for sensor 2' is uncertainty$_2$(4)= (1·0)=0
  for this sensor allocation uncertainty J(4)=1·6+0·0=6

Thus, at t=3 it is J(t)=3 independent of our choice. However, at t=4, depending on the choice made at t=3, we can either reduce J(t) to 1 or keep it at 3. This illustrates that using the presented approach enables us to consider future uncertainty gain in our choice (here for the allocation of a sensor to location 1 or 2) with the aim to reduce the overall information uncertainty in the system.

Thus, using the method according to an embodiment of the present invention, the information gathered from the sensor may be optimized for the available sensors. As shown by the application scenario of FIGS. 6 and 7, had it used a traditional system and sampled sub-areas periodically, uncertainty would increase because it is monitored sub-area 2—which changes slowly or predictable—while letting sub-area 1 rapidly evolve and increase the uncertainty of the collected information.

This invention and/or preferred embodiments proposes an information gain approach to optimally schedule mobile sensors which maximizes the collected information for a limited sensor fleet size.

Many modifications and other embodiments of the invention set forth herein will come to mind to the one skilled in the art to which the invention pertains having the benefit of the teachings presented in the foregoing description and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for observing a predetermined monitoring area, wherein one or more sensing platform nodes are employed to observe a predetermined number of sub-areas of the monitoring area, the method comprising:

observing the sub-areas of the monitoring area using the sensing platform nodes so as to collect measuring data for the sub-areas, providing at least one prediction model for analyzing predictability of measuring data for the sub-areas based on the collected measuring data, calculating future measuring data for the sub-areas and calculating uncertainty of the future measuring data over time using the prediction model, and scheduling the sensing platform nodes for observation of the sub-areas according to a scheduling mechanism, wherein the scheduling of the sensing platform nodes is dependent on the calculated uncertainty of the future measuring data predicted for the sub-areas, wherein the scheduling is performed on the basis of a cost function J(t) according to:

$$J(t) = \sum_i P_i \cdot \text{uncertainty}_i(t) \; \forall \; i \in \text{sub-areas to observe}$$

wherein uncertainty$_i$(t) is the uncertainty of the calculated future measuring data for a respective one of the observed sub-areas i at time t, wherein parameter P$_i$ is 0 in a case that a respective one of the sensing platform nodes observes the sub-area i at time t, and wherein parameter P$_i$ is 1 in a case that the respective one of the sensing platform nodes does not observe the sub-area i at time t.

2. The method according to claim 1, wherein the sensing platform nodes include static sensing platform nodes that are located on the sub-areas of the monitoring area, wherein the static sensing platform nodes are accessed/actuated for observing the sub-areas according to the scheduling mechanism.

3. The method according to claim 1, wherein the sensing platform nodes include mobile sensing platform nodes that are movable to the sub-areas of the monitoring area, wherein the mobile sensing platform nodes are moved to the sub-areas for observing the sub-areas according to the scheduling mechanism.

4. The method according to claim 1, wherein the sensing platform nodes sense a numerical quantity.

5. The method according to claim 1, wherein the measuring data of a respective one of the observed sub-areas is provided as a time series of values, wherein by learning from the provided values the prediction model is derived for predicting future values representing the future measuring data of the sub-area.

6. The method according to claim 1, wherein the uncertainty of the calculated future measuring data is calculated by determining and/or considering confidence intervals pertaining to the calculated future measuring data.

7. The method according to claim 1, wherein the uncertainty of the calculated future measuring data of a respective one of the observed sub-areas is calculated by considering the uncertainty and/or the measuring data of one or more nearby ones of the observed sub-areas.

8. The method according to claim 1, wherein the scheduling mechanism considers an aggregated uncertainty of the future measuring data with regard to the observed monitoring area, and wherein the scheduling is performed in such a way that the aggregated uncertainty is reduced and/or minimized.

9. The method according to claim 1, wherein the scheduling of the sensing platform nodes is determined using an optimization algorithm such that the uncertainty is minimized.

10. The method according to claim 1, wherein the scheduling mechanism is individually implemented in the sensing platform nodes such that the sensing platform nodes are able to make autonomous scheduling decisions.

11. A system for observing a predetermined monitoring area, the system comprising:
at least one sensing platform node for observing a predetermined number of sub-areas of the monitoring area, the system being configured to observe the sub-areas of the monitoring area using the sensing platform node so as to collect measuring data for the sub-areas, at least one prediction model configured to analyze predictability of measuring data for the sub-areas based on the collected measuring data, to calculate future measuring data for the sub-areas and to calculate uncertainty of the future measuring data over time, and at least one planner configured to schedule the sensing platform node for observation of the sub-areas, wherein the scheduling of the sensing platform node is dependent on the calculated uncertainty of the future measuring data predicted for the sub-areas;

wherein the at least one planner is configured to perform the scheduling on the basis of a cost function J(t) according to:

$$J(t) = \sum_i P_i \cdot \text{uncertainty}_i(t) \; \forall \; i \in sub-\text{areas to observe}$$

wherein uncertainty$_i$(t) is the uncertainty of the calculated future measuring data for a respective one of the observed sub-areas i at time t, wherein parameter P$_i$ is 0 in a case that a respective one of the sensing platform nodes observes the sub-area i at time t, and wherein parameter P$_i$ is 1 in a case that the respective one of the sensing platform nodes does not observe the sub-area i at time t.

12. The system according to claim 11, wherein one or both of the prediction model and the planner are implemented at the sensing platform node.

13. The system according to claim 11, wherein one or both of the prediction model and the planner are implemented centralized.

14. The system according to claim 13, wherein one or both of the prediction model and the planner are implemented as a receiver which receive the measuring data collected by the sensing platform node.

15. The method according to claim 1, comprising aggregating, across the sub-areas, the calculated uncertainty and scheduling the sensing platform nodes based on the aggregated uncertainty.

16. The method according to claim 1, wherein the uncertainty of the future measuring data is calculated as a function of time.

17. The method according to claim 16, wherein the scheduling of the sensing platform nodes is dependent on the calculated uncertainty of the future measuring data predicted for the sub-areas at multiple different points in time.

* * * * *